(12) United States Patent
Khan

(10) Patent No.: US 12,554,756 B1
(45) Date of Patent: Feb. 17, 2026

(54) AUTO COLLECTION PROCESSING

(71) Applicant: Cisco Technology, Inc., San Jose, CA (US)

(72) Inventor: Haaris Khan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/952,581

(22) Filed: Nov. 19, 2024

(51) Int. Cl.
  *G06F 16/33* (2025.01)
  *G06F 16/334* (2025.01)

(52) U.S. Cl.
  CPC .................... *G06F 16/334* (2019.01)

(58) Field of Classification Search
  None
  See application file for complete search history.

(56) References Cited

U.S. PATENT DOCUMENTS

| | | | |
|---|---|---|---|
| 6,934,699 B1 * | 8/2005 | Haas | G06F 16/24545 |
| 7,437,371 B2 * | 10/2008 | Rathakrishnan | G06F 16/289 |
| 7,865,533 B2 * | 1/2011 | Meijer | G06F 16/9032 |
| | | | 707/804 |
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 * | 7/2014 | Neels | G06F 16/248 |
| | | | 707/765 |
| 9,215,240 B2 | 12/2015 | Merza et al. | |
| 9,286,413 B1 | 3/2016 | Coates et al. | |
| 10,124,258 B2 | 11/2018 | Lamas et al. | |
| 10,733,184 B2 * | 8/2020 | Merker | G06F 16/252 |
| 11,693,859 B2 * | 7/2023 | Radu | G06F 16/24534 |
| | | | 707/706 |
| 11,841,853 B2 * | 12/2023 | Curtis | G06F 16/2443 |
| 2012/0158763 A1 * | 6/2012 | Meijer | G06F 16/2433 |
| | | | 707/760 |
| 2019/0098106 A1 | 3/2019 | Mungel et al. | |

OTHER PUBLICATIONS

Splunk Enterprise 8.0.0 Overview, available online, retrieved May 20, 2020 from docs.splunk.com (17 pages).

(Continued)

*Primary Examiner* — Debbie M Le
(74) *Attorney, Agent, or Firm* — Shook, Hardy & Bacon L.L.P.

(57) ABSTRACT

Auto collection processing includes detecting an auto collection operator in a set of query instructions. The set of query instructions include a multimode field operator that executes on elements in a single field of a single event based on a collection type of the single field. Auto collection processing includes processing an event of the events according to the set of query instructions. Processing the event includes executing, by auto collection instructions, a first and second collection type field check on a field to determine whether the collection type of the field is a first collection type or a second collection type, respectively. Processing the event further includes processing, by second data mode instructions identified by the multimode field operator and based on the collection type being the second collection type, values to generate a query result. Auto collection processing further includes outputting the query result.

20 Claims, 9 Drawing Sheets

(56) References Cited

OTHER PUBLICATIONS

Splunk Cloud 8.0.2004 User Manual, available online, retrieved May 20, 2020 from docs.splunk.com (66 pages).
Splunk Quick Reference Guide, updated 2019, available online at https://www.splunk.com/pdfs/solution-guides/splunk-quick-reference-guide.pdf, retrieved May 20, 2020 (6 pages).
Carasso, David, "Exploring Splunk" published by CITO Research, New York, NY, Apr. 2012 (156 pages).
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010 (9 pages).
"foreach, Splunk Cloud Platform, Search Reference 8.2.2203", Jul. 1, 2022, 13 pages.

\* cited by examiner

400

Execute, by auto collection instructions identified by the auto collection operator, a first collection type field check on a field in the event to determine whether the collection type of the field is a first collection type
402

↓

Process, by first data mode instructions identified by the multimode field operator and when result of first data mode field check indicates the collection type is a first collection type, the values to generate a query result
404

↓

Execute, when the collection type of the first field is not the first collection type, a second collection type field check on the field to determine whether the collection type of the field is a second collection type
406

↓

Process, by second data mode instructions identified by the multimode field operator and based on the collection type being a second collection type, values to generate a query result
408

*502 Example Source Query*

$search = FROM [{}] | eval obj = {"foo": "bar", "baz": "bat"}, keys = json_keys(obj), values = map(keys, $it -> json_extract(obj, $it))

*504 Example Compiled Query*

| makeresults
| eval obj=json_object("foo", "bar", "baz", "bat"), keys=json_keys(obj), values=json_array()
| foreach mode=auto_collections keys [eval values = json_append(values, "", json_extract(obj, <<ITEM>>))]

*506 Example Field in an Event* obj = { "brand": "Ford", "model": "Mustang", "year": 1964 }

*508 Example Result* values: ["Ford", "Mustang", 1964]

FIG. 5

AUTO COLLECTION PROCESSING

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Storage systems can store large volumes of data, such as in centralized locations that are accessible to users. To access the data, users transmit queries to the storage system. The query may include a set of criteria defining matching data and, optionally, one or more operations to perform on the matching data. The storage system processes the query by executing instructions specified by the query. When executing the instructions, the storage system searches the storage devices for data matching the set of criteria to generate a set of matching data. If the query requests further processing on the set of matching data, then the processors perform the additional processing to generate query results. The query results are then transmitted back to the user.

BRIEF DESCRIPTION OF THE DRAWINGS

Illustrative examples are described in detail below with reference to the following figures:

FIG. 4 shows a flow diagram of an example process for executing auto collection instructions in a query on the example computing environment.

FIG. 5 shows an example query that uses an auto collection operator.

DETAILED DESCRIPTION

Figure 1:
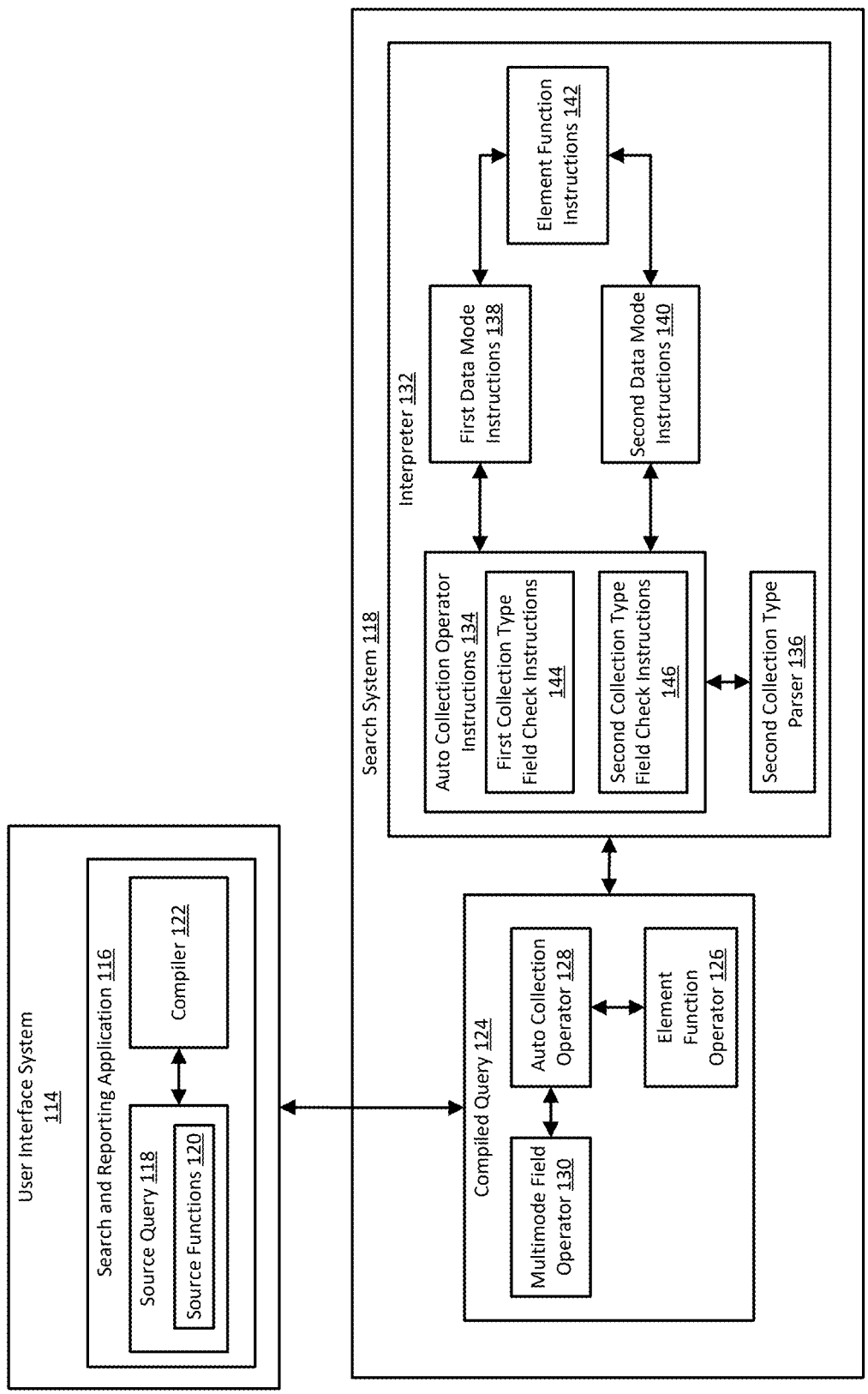
FIG. 1 is a block diagram of an example computing environment that processes queries.

A data intake and query system stores events for further processing. An event may be machine generated data that is associated with a timestamp. Events may be stored in buckets, whereby the bucket is based at least in part on the timestamp associated with the event. Each event includes one or more fields. A field is a searchable name value pair that is separated from other fields using field delimiters. For example, a query for event data may include a time range for a timestamp and one or more field values of one or more fields. Fields may be single value fields, such as numeric values or strings while other fields are collections. A collection is a group of elements, whereby each element is distinct from other elements and may be separated by element delimiters.

A field of one or more events may be a collection at time of storage or as part of query results returned as part of a query. In either case, the type of collection may be unknown. For example, with regards to storage, the data intake and query system may store events in an ad hoc fashion, whereby the storage of the event is not tied to the particular fields of the events. Thus, for a field that is a collection, the type of collection may be unknown at the time of storage of the event. As another example, with regards to the query, a query may be generated in a high-level programming language and then compiled into a lower-level language that is executed. A function within the query in the lower-level language may create a collection for a query result, whereby the type of collection is unknown at the time of compilation.

Functions within a query may also process elements within the collection. In order to process the elements, the function needs to be able to parse the collection. When the collection type is unknown and is obfuscated to a user, a challenge exists in the computing system processing individual elements in a collection according to the query.

To address the challenge, one or more embodiments introduce an auto collection operator to queries. The auto collection operator reference auto collection type instructions that determine the collection type of a collection. Specifically, the auto collection instructions may iterate through different field checks to determine the collection type of a particular field of an event. The collection type may then be passed to a function that processes the elements of the field. Using the collection type, the function performs operations on one or more individual elements in the field.

By way of an example, consider the scenario in which a user wants the total of the values of each element of a collection field that is output by another operator. Because the user writes the query in a higher-level language, the user does not know the collection type. Further, the computing system may not know the collection type until after the query is executed. The user's query is compiled into a lower-level language query that includes a multiple mode (i.e., multimode) "for each" operator. The multimode "for each" operator performs the same operation on each element of a field. The multimode "for each" operator can operate in different modes as defined by the collection type to obtain and process individual elements using a summation function. Because the collection type is unknown, the auto collection operator is added to the query to output the collection mode. When the query is executed, auto collection instructions identified by the auto collection operator performs collection type checks on the field to determine the collection type. When the collection type is determined, the collection type is passed to the multimode "for each" operator to set the mode. The particular mode instructions corresponding to the collection type of the multimode "for each" operator are executed on the collection type. Thus, the multimode "for each" operator may iterate through the elements of the field according to the collection type to obtain a total of the elements.

Turning to the figures, FIG. 1 is a block diagram of an example computing environment that processes queries. As shown in FIG. 1, the system includes a user interface system 114 and a search system 112. Each of these components are presented below.

The user interface system 114 is configured to interface with a user. Namely, the user interface system 114 is the system through which a user may access the functionality of the search system 112. The user interface system 114 may be the computing system of the user or another computing system, such as a server or an intermediary computing system. The user interface system 114 includes a search and reporting application 116. The search and reporting application 116 includes user interface widgets to receive source queries and generate results. Other sources of queries may exist, such as other software applications that automatically generate source queries.

The search and reporting application 116 includes functionality to obtain a source query 118. For example, the source query 118 may be submitted in the user interface widget of the search and reporting application 116. As another example, the source query 118 may be generated from a natural language query by the search and reporting application 116. As another example, the source query 118 may be received via an application programming interface (API) of the search and reporting application 116.

The source query 118 may include a search command requesting a search for particular data from the data intake and query system. The source query 118 may also include operational commands that specify one or more source functions 120. A source function 120 requests operations on matching data that is generated by the search command. For example, a source function 120 may modify the matching data or may perform evaluation operations on the matching data. Other types of source functions 120 may be used in the source query 118. More than one search command or operational command may exist in the source query 118. The source query 118 may also include storage commands to store results in a predetermined location.

In some embodiments, the source query 118 is a query pipeline. A query pipeline is a sequence of commands, whereby each command is in a particular order. The particular order is so that the output of a previous command is an input to the next command. For example, the output of the immediately preceding command may be the input to the immediate next command.

Each command in the sequence of commands has a command identifier and any parameters of the command. The command identifier uniquely identifies a type of command to perform. In other words, the command identifier identifies the set of instructions to perform. The parameters are any input controls specifying how to perform the operation. Execution of the command may further use input data. The input data may be the results of the previously processed command.

Figure 7:
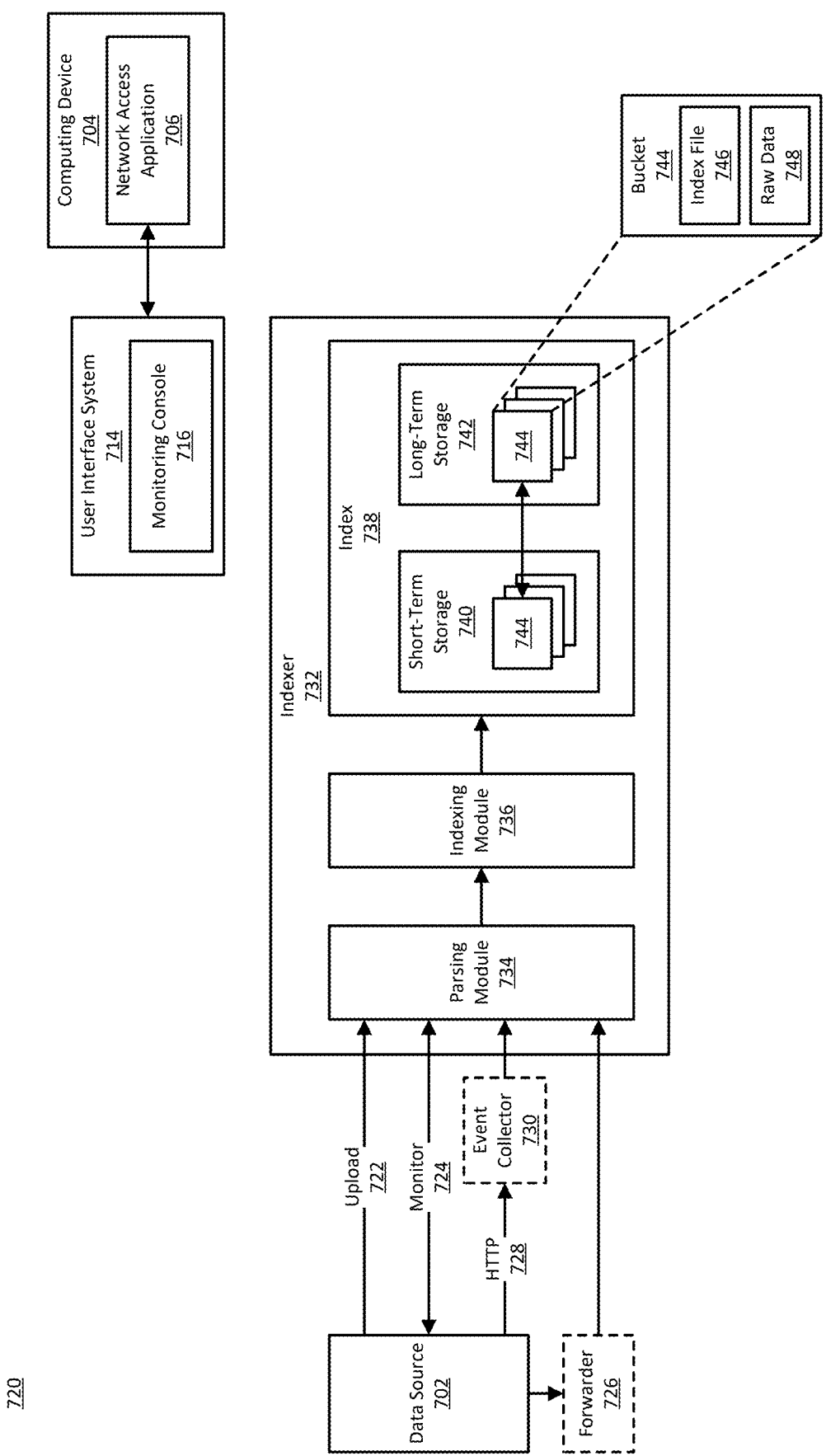
FIG. 7 is a block diagram illustrating in greater detail an example of an indexing system 720 of a data intake and query system.

For example, the pipeline may be a query evaluation pipeline that obtains and processes data from a data store, such as the data store described in FIG. 7. In such a scenario, the query evaluation pipeline may include a search command, an evaluation command, a statistics command, and/or other commands. By way of another example, the pipeline may be a data processing pipeline, whereby an end user provides a sequence of commands for execution on a user-provided data set.

By way of a more specific example, the source query 118 includes various commands written in a pipeline query language, such as Splunk Processing Language (SPL). SPL is a pipeline search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In some embodiments, the source query is written in a higher-level query language that is then compiled by a compiler 122 into a compiled query 124. The term, compiler 122, corresponds to the standard definition used in the art. Namely, the compiler 122 is a computer program that translates computer code written in one programming language (i.e., the source language) into another language (i.e., the target language). In the process of translating the computer code, various optimizations and modifications may be performed automatically by the computing system. Thus, the compiled query 124 may be more efficient to execute over the source query 118.

By using a compiler 122, the source query 118 may be in a higher-level query language that is more easily understandable to a user and then translated to a lower-level query language that is more efficient for a computing system to execute. By way of an example, the higher-level query language may be version two of SPL (i.e., SPL2) while the lower-level query language may be version one of SPL (i.e., SPL1).

Similar to the source query 118, the compiled query 124 includes various commands, such as search commands, operational commands, and storage commands, similar to as described above, but in the lower-level language. The commands obtain values of fields from events in storage and process the values. In the compilation process, the output of executing a command with input of one or more events may be a field that is a collection. For example, the output of executing a first command on an event may be an event that has at least one field with multiple values. Because of the compilation process, the collection type of the field may be unknown.

Similarly, in some cases, the types of fields may not be evident in the stored events on the data intake and query system. Moreover, events may be heterogenous. For example, events from different data sources may be obtained together responsive to the same query. Each data source may output events with different fields. Thus, the type of fields may be different across the events. Accordingly, the collection type of a field for a particular event may be unknown.

Continuing with FIG. 1, because of the unknown collection type of a field, to perform operations on the elements of a particular field, the compiled query 124 includes an element function operator 126, a multimode field operator 130, and an auto collection operator 128. Each operator includes an identifier of a corresponding function and parameters to use when executing the corresponding function. Specifically, the operator is a call site in the query that references particular instructions (i.e., called instructions) with one or more parameters.

An element function operator 126 is an operator that references instructions that operate on one or more individual elements in a particular field of events. The field is a collection, but the collection type of the field is unknown. To manage memory usage, the element function operator 126 may be restricted to evaluation functions. By restricting the type of element function operator, the amount of memory used in processing a query is limited so as to not overtax the computing system in processing the query. Examples of the restricted set of evaluation functions include statistical functions to perform statistics on the set of values, append functions to append information to the set of values, mathematical functions, deduplication functions to remove duplicated values in a set of values, and other types of functions that perform particular operations on a particular field.

The multimode field operator 130 is an operator that references particular elements in a field that is a collection.

The multimode field operator 130 may iterate through the elements. As another example, the multimode field operator 130 may operate on a particular value defined based on the position of the element or the value of the element. By way of an example of a multimode field operator 130 that iterates through elements, the multimode field operator 130 may be a "For Each" operator. The "For Each" operator calls to perform the same element function operator 126 on each of the elements of the particular field. The multimode field operator 130 has multiple modes depending on the collection type of field. Each mode corresponds to a distinct set of instructions that references the corresponding instructions for the mode. The parameters of the multimode field operator 130 may include the mode or the auto collection operator 128, an identifier of the field, and the element function operator 126.

The auto collection operator 128 is an operator that references instructions to determine the collection type. By way of an example, the collection type may be an unstructured data format (i.e., unstructured type) or a structured data format (i.e., structured type). In the unstructured type, the elements of the field are separated by element delimiters. The element delimiters are uniform separators between elements. The element delimiters may be, for example, new line characters, space characters, tab characters, or a predefined symbol. A structured type is a type that complies with a structured data format. For example, a structured type may be JAVASCRIPT® Object Notation (JSON) format, extensible Markup Language (XML) format, other data serialization format, or another structured format. Various types of collection types may exist that may be differentiated by the auto collection operator 128, and embodiments are not limited to structured and unstructured collection types.

Although the compiled query is shown as only including the various operators in FIG. 1, additional commands and operators may be included in the compiled query that are not shown. Further, the compiled query 124 or the source query 118 may be a scheduled query that is scheduled to execute at a particular time, a query that is configured to execute repetitively, an ad hoc query that executes when the query is received, or another type of query.

An interpreter 132 may be configured to interpret the operations specified in the compiled query 124. The interpreter 132 includes functionality to cause the computer system to perform the instructions specified by the compiled query 124. The interpreter 132 includes auto collection operator instructions 134, a second collection type parser 136, first data mode instructions 138, second data mode instructions 140, and element function instructions 142.

The auto collection operator instructions 134 are instructions that perform the operations corresponding to the auto collection operator 128, described above. The auto collection operator instructions 134 use, as input, an identifier of a field that is a collection, and return, as output, the collection type of the field. In one or more embodiments, the auto collection operator instructions 134 include first collection type field check instructions 144 and second collection type field check instructions 146. The first collection type field check instructions 144 and second collection type field check instructions 146 are instructions to check whether the collection type is a first collection type or second collection type, respectively. The auto collection operator instructions 134 may include additional collection type field check instructions. Some of the collection type field check instructions, such as the first collection type field check instructions 144, may check whether the collection type is a basic type (or simple type or primitive type) in the lower-level programming language. A basic type is a lowest granularity level data type recognized by the programming language from which complex types are constructed. For example, an unstructured type may be a basic type in the particular programming language. Thus, checking whether the collection type is the simple check may be performed with a native type checking instruction. Some of the collection type field check instructions, such as the first collection type field check instructions 144, may check whether the collection type is a basic type (or simple type) in the lower-level programming language. In the example shown, the first collection type field check instructions 144 refer to a native function of the programming language that performs type checking.

Some of the collection types may be complex types. Complex types may be composed of one or more basic types and are not natively recognized by the programming language. For example, a structured collection type may be stored as a String and have predefined symbols within the String that separate out values of another type. For a complex type, the second collection type field check instructions 146 may have instructions for parsing the second collection type. For example, the second collection type field check instructions 146 may include an instruction that calls a second collection type parser 136 and tests whether the parser outputs an error or parses the field correctly. A second collection type parser 136 is a parser specific to the second collection type that includes functionality to parse a field of the second collection type. For example, the second collection type parser 136 may be a structured data format parser.

Although FIG. 1 shows two collection type field check instructions, multiple collection type field check instructions may exist. The collection type field check instructions may be similar as described above to the first collection type field check instructions 144 and the second collection type field check instructions 146 with regards to calling or not calling a parser. Further, although FIG. 1 show the first collection type field check instructions 144 as not referencing a collection type parser and the second collection type field check instructions 146 as referencing a collection type parser, either collection type field check instructions, both collection type field check instructions, or none of the collection type field check instructions may reference a corresponding collection type parser.

Continuing with FIG. 1, the first data mode instructions 138 and the second data mode instructions 140 are the called instructions for the multimode field operator 130 for the respective collection type. The first data mode instructions 138 are first modal instructions implementing the multimode field operator for the first collection type. The second data mode instructions 140 are second modal instructions implementing the multimode field operator for the second collection type. For example, the first data mode instructions 138 may be multiple value mode instructions, and the second data mode instructions 140 may be structured data mode instructions. Each of the data mode instructions implement the field operator to iterate or identify an element in a field for a particular collection type.

Each of the data mode instructions call element function instructions 142 for one or more values of elements in the field. The element function instructions 142 perform the operations of the element function, described above. For example, the element function instructions 142 may perform the evaluation operations of the element function.

The computing environment of FIG. 1 may be implemented within the computing environment of FIGS. 6-9, described in further detail below. For example, the user interface system 114 of FIG. 1 may be the user interface system 814 shown in FIG. 8. In the implementation, the source query or compiled query may be query 866 from the search and reporting application 816. The search system 112 in FIG. 1 may be implemented in the search head 862 or the search peer 864 in FIG. 8. For example, the interpreter 132 in FIG. 1 may execute in the results processing 882 or the event processing 876 in FIG. 8. For example, each search peer 864 may perform a portion of the instructions for events on the search peer 864 in the event processing 876. The output may be combined in the results processing 882 in FIG. 8. Various configurations and implementations of FIG. 1 in the data intake and query system described in FIGS. 6-9 may be used.

Figure 2:
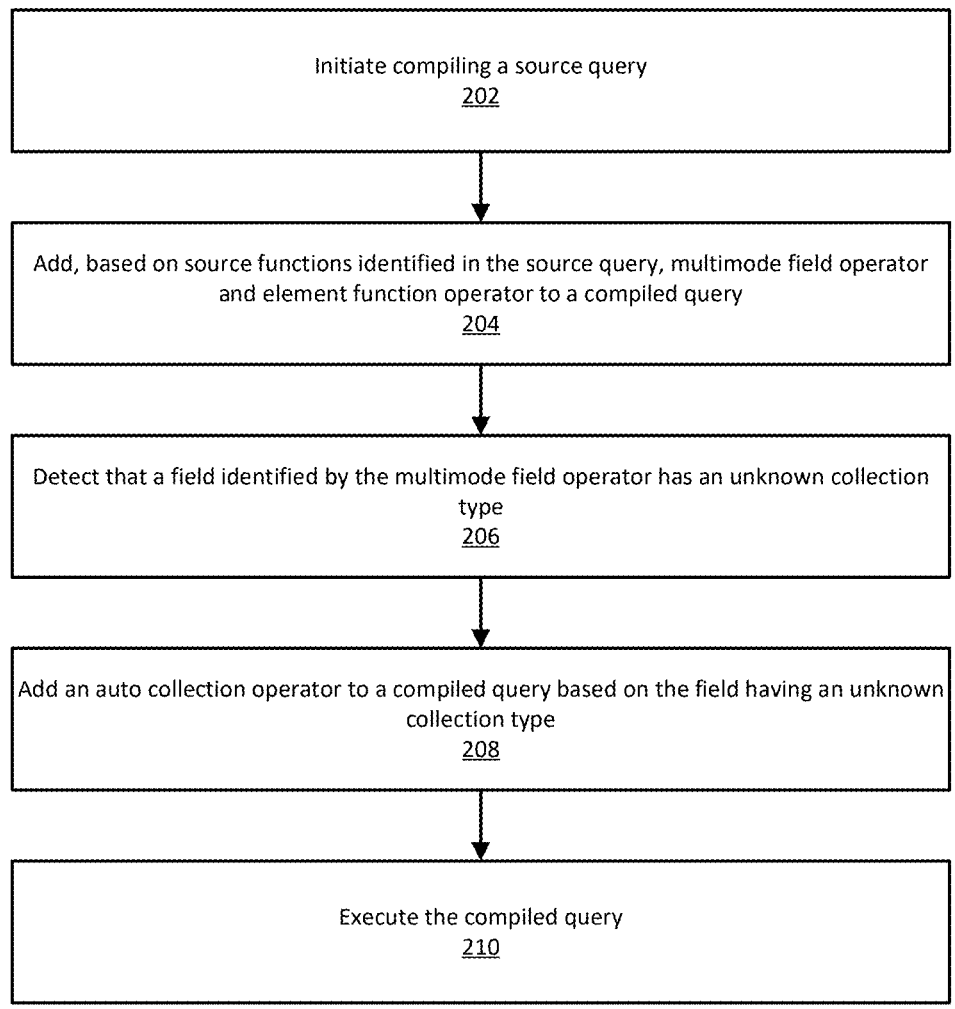
FIG. 2 is a flow diagram of an example process for compiling a query for execution on the example computing environment.
Figure 3:
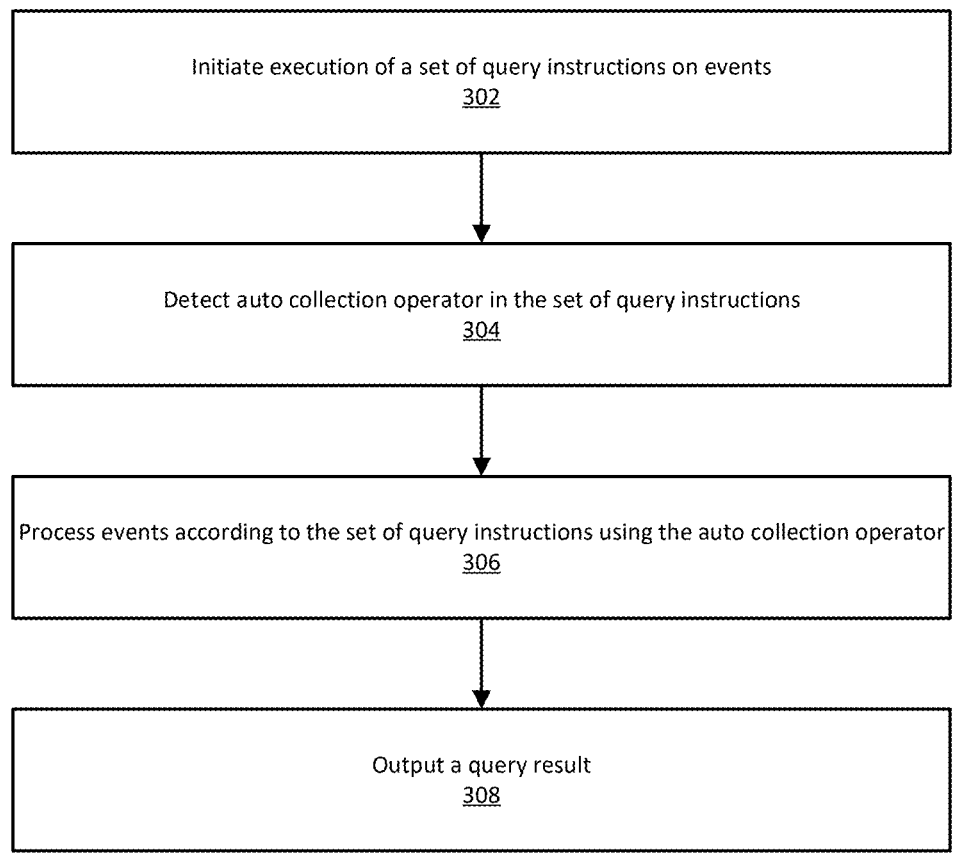
FIG. 3 is a flow diagram of an example process for executing a query on the example computing environment.

Continuing with the figures, FIGS. 2, 3, and 4 example processes in accordance with embodiments of the disclosure. The example processes can be implemented, for example, by a computing device that comprises a processor and a non-transitory computer-readable medium. The non-transitory computer readable medium can be storing instructions that, when executed by the processor, can cause the processor to perform the operations of the illustrated processes. Alternatively, or additionally, one or more of the example processes can be implemented using a non-transitory computer-readable medium storing instructions that, when executed by one or more processors, cause the one or more processors to perform the operations of the process.

FIG. 2 is a flow diagram 200 of an example process for compiling a query for execution on the example computing environment. In Block 202, compiling of a source query is initiated. The compilation may be initiated when a user submits a query in a higher-level programming language. For example, a user selecting a submit button may trigger compilation of the query from a higher-level language to a lower-level language.

In Block 204, based on the source functions identified in the source query, a multimode field operator and an element function operator are added to the compiled query. One of the source functions may be translated to a multimode field operator that calls the element function.

In Block 206, a field identified from the multimode field operator is detected as having an unknown collection type. The compiler determines that the data mode of the multimode field operator should be set. The compiler attempts to determine the collection type. For example, using predicate pushdown, the compiler may trace the data types of the fields, including the collection types of the fields. In some cases, the collection types may be unknown. For example, the field referenced in the multimode field operator may be an original field in which because of the late binding schema, the collection is unknown until the events are processed in the query. As another example, another command in the compiled query may output different collection types depending on the input to the other command that cannot be determined. Either way, the compiler determines that the parameter of the multimode field operator cannot be determined.

In Block 208, an auto collection operator is added to the compiled query based on the field having an unknown collection type. The auto collection operator is added to take as input the field and to output the mode which is used as a parameter of the multimode field operator. Because the compilation may be performed without user interaction or request, the adding of the auto collection operator may be hidden to the user. Thus, the user does not need to track the collection type of the field in order to submit a query.

In Block 210, the compiled query is executed. During execution, the collection type of the field is determined using the values of an event. Executing the compiled query may be performed as described in FIG. 3.

FIG. 3 shows a diagram for executing a query. The query may be a compiled query or an original source query that is executed. Turning to FIG. 3, in Block 302, execution of a set of query instructions is initiated on events. The various commands in the query are embodied by operators in the query that have corresponding parameters. During execution, the interpreter executes the query instructions matching the operators specified in the query using the parameters. A first command may be a search command in which the parameters of the operator are the search command. The instructions for the search command are executed as described below to obtain events matching a set of criteria defined by the search command. The events may be directly or indirectly used as input to the remaining portion of the query. Further, additional searches may be performed based on the results of executing one or more query instructions.

In Block 304, an auto collection operator is detected in the set of query instructions. During execution of the sequence of query instructions, an auto collection operator is encountered. The events are processed according to the set of query instructions using the auto collection operator in Block 306. Similar to the other operators of the command, the interpreter executes the auto collection operator instructions responsive to encountering the auto collection operator. To execute the auto collection operator instructions, one or more collection type field check instructions are executed on the computing processor of the computing environment. The collection type field check instructions use as input, a field of an event, and produce, as output, the collection type of the field.

In some implementations, the events are heterogeneous with regards to the same field. By way of an example, for the same field, one event in the set of events, which are processed by FIG. 3, may have the collection type be an unstructured type while the collection type is a structured type for another event. To handle such possibility, the processing of Block 306 is performed independently for each event. Namely, the auto collection operator processes the instance of a particular field for each event in the set of events. The values of the instance of the field are used to determine the collection type of the instance. By way of a more specific example, consider the scenario in which the set of events includes events A, B, and C. Each event in the set of events includes field X that is a collection. The collection type of field X may be unknown for each of the events. In the example, the auto collection operator executes on the values of field X in event A to determine the collection type for field X in event A, executes on the values of field X in event B to determine the collection type for field X in event B, and executes on the values of field X in event C to determine the collection type for field X in event C.

In some implementations, the events are known to be homogeneous with regards to the same field. Thus, the same field has the same collection type, albeit different values, across the different events. In such a scenario, the processing of the auto collection operator may be performed once for the initial event being processed and then applied to the later events being processed. By way of a more specific example, consider the scenario in which the set of events includes events A, B, and C. Each event in the set of events includes field X that is a collection. The collection type of field X may be unknown for each of the events. In the example, the auto collection operator executes on the values of field X in event A to determine the collection type for field X in event A and then applies that same collection type for field X in event B and field X in event C.

The processing of Blocks 302, 304, and 306 continue until execution of the set of query instructions completes. If the operations are executed on one or more search peers, then the query results may be combined on the search head. The result of processing the events is a query result. In Block 308, the query result is outputted. Outputting the query result may include storing the query result, returning the query result to a software application responsive to the query, or displaying the query result in a user interface.

FIG. 4 is a flow diagram of an example process for executing a query on the example computing environment. Specifically, FIG. 4 expands on Block 306 in FIG. 3 to execute auto collector operator instructions. In Block 402, auto collection instructions identified by the auto collection operator execute a first collection type field check on a field in the event to determine whether the collection type of the field is a first collection type. If the first collection type is a particular basic type in the lower-level programming language, performing the first collection type field check instructions may be to check whether the value of the field complies with the basic type using native instructions of the programming language. For example, a multiple value field may be a basic type in which values are separately associated with individual elements of the field. Type checking the multiple value field may be performed by one or more native instructions in the language. Basic types can therefore be checked with minimal compute cycles of a processor.

If the first collection type is not a basic type, the processing may be to check whether the field can be parsed according to the first collection type. Executing a parser generally takes more compute cycles than testing whether the field is a basic type. Thus, an initial operation may be performed to determine whether the value of the field overall complies with the basic type for the field overall that is of the complex type. Stated another way, the value of a structured field may be stored as a String, which is a basic type. The String may be parsed to extract values of the individual elements of the field. Thus, an initial type checking test may be performed to determine whether the field is a String. If the field is not a String, then the test may fail (e.g., the query is deemed invalid or has an error). Thus, the compute cycles to execute a parser are saved. If the field is a String, a collection type parser that is specific to the first collection type may be called using the value of the field as input. The collection type parser attempts to parse the value to partition the field into individual values of elements. For example, the collection type parser may parse the field according to the symbols and keywords of the particular collection type. If parsing is successful, then the collection type is deemed the first collection type. Otherwise, the collection type is not the first collection type.

In Block 404, the first data mode instructions, identified by the multimode field operator, processes the values of the elements of the field to generate a query result when the result of the first data mode field check indicates the collection type is a first collection type. If the collection type is detected as being the first collection type in Block 402, then the mode of the multimode field operator is set to the first data mode matching the first collection type. The instructions of the first data mode are executed. During execution, the instructions may call the element function instructions to process individual elements of the query.

In Block 406, when the collection type of the first field is not the first collection type, a second collection type field check is executed on the field to determine whether the collection type of the field is a second collection type. Executing the second collection type field check instructions may be performed in a similar manner as discussed above with respect to executing the first collection field check instructions. In some implementations, if one collection type is a basic type and another collection type is a complex type, then checking whether the collection type is the basic type is performed before (e.g., in Block 402) and checking whether the collection type is the complex type (e.g., in Block 406). By ordering which collection type checking is performed, such implementations may reduce the compute cycles by calling the collection type parser less.

If the collection type is determined to be the second collection type, the second data mode instructions identified by the multimode field operator processes the values of the elements in the field to generate a query result based on the collection type being a second collection type in Block 408. The auto collection operator outputs that the data mode is the second collection type. The data mode is then set as a parameter of the multimode field operator to cause the second data mode instructions to execute. The second data mode instructions operate on the values of the elements of the field according to the collection type being the second collection type. Blocks 404 and 406 generate results based on the individual elements of a field that is a collection. The results may be passed as a parameter to the next operator in the query as part of continuing to process the set of query instructions. As another example, the result may be a query result.

FIG. 5 shows a flow diagram of an example process for executing auto collection instructions in a query on the example computing environment. In the example, consider the scenario in which the user wants to simulate Python programming language values function in SPL2 language to return all values in a field of an event for a dictionary. In the example, the user provides the example source query 502. As shown, the example source query includes a search for all events. The source query 502 also includes the format of the object to evaluate including which part is the key and which part is the value, as well as a map function to extract the value.

The source query 502 in SPL2 is compiled to create the example compiled query 504 in SPL1. During compilation, the compiler identifies that the field is a collection, but not the type of collection. Thus, the compiler adds the foreach, which is a multimode field operator, in order to iterate through the field that is a collection. The foreach is a "for each" operator in SPL1. The mode of the field is unknown, so auto collection is added to determine the mode which is set for the foreach operator. Once the auto collection determines the collection type, the foreach instructions iterates through the collection.

In the example, consider the scenario in which the example field 506 in an event is a JSON object. Executing the compiled query 504 on the example field 506 generates results 508. The auto collection operator instructions determines that the collection type is not a multivalue field. Thus, the auto collection operator instructions tests whether the field is String type. If the field is a String type, then the auto collection operator instructions include a call to a JSON parser on the field of the event to test whether the field can be parsed. If the field can be parsed, then the field is determined to be a JSON object. Thus, the for each operator instructions are set to the mode for JSON object, and the values in the example results 508 are extracted.

As shown in the example, the user does not need to know the collection type of the field or even that the query is compiled to add a for each operator. Moreover, the compiler does not need to determine the type of data for the events. The testing is performed when the query is executed on the events and the mode is set for the for each operator instructions.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively, or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 6:
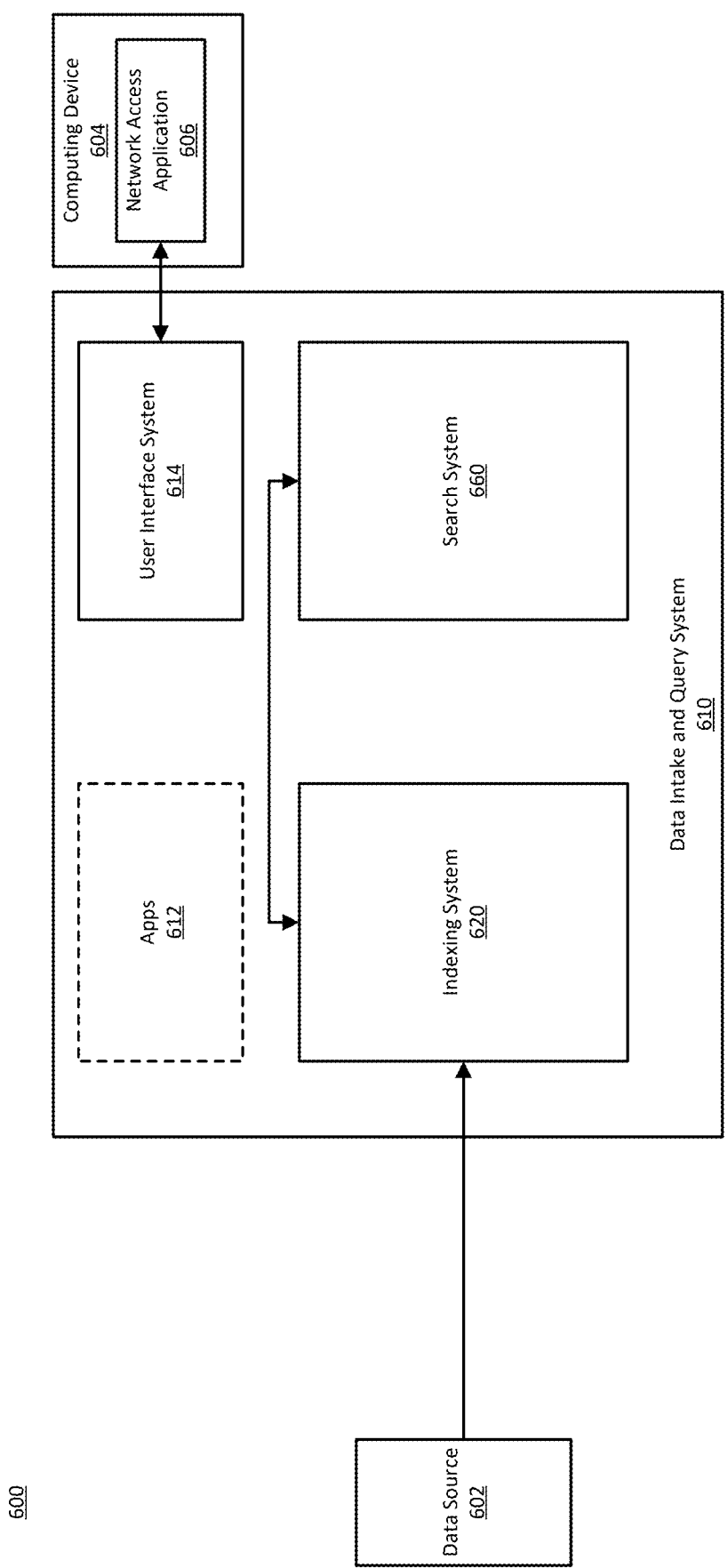
FIG. 6 is a block diagram illustrating an example computing environment that includes a data intake and query system.

FIG. 6 is a block diagram illustrating an example computing environment 600 that includes a data intake and query system 610. The data intake and query system 610 obtains data from a data source 602 in the computing environment 600, and ingests the data using an indexing system 620. A search system 660 of the data intake and query system 610 enables users to navigate the indexed data. Though drawn with separate boxes in FIG. 6, in some implementations the indexing system 620 and the search system 660 can have overlapping components. A computing device 604, running a network access application 606, can communicate with the data intake and query system 610 through a user interface system 614 of the data intake and query system 610. Using the computing device 604, a user can perform various operations with respect to the data intake and query system 610, such as administration of the data intake and query system 610, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 610 can further optionally include apps 612 that extend the search, analytics, and/or visualization capabilities of the data intake and query system 610.

The data intake and query system 610 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 610 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 610 can be executed on a single computing device, or execution of the program code can be distributed over multiple computing devices. For example, the program code can include instructions for both indexing and search components (which may be part of the indexing system 620 and/or the search system 660, respectively), which can be executed on a computing device that also provides the data source 602. As another example, the program code can be executed on one computing device, where execution of the program code provides both indexing and search components, while another copy of the program code executes on a second computing device that provides the data source 602. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 602 of the computing environment 600 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 602 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 620 obtains machine date from the data source 602 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 620 does not require prior knowledge of the structure of incoming data (e.g., the indexing system 620 does not need to be provided with a schema describing the data). Additionally, the indexing system 620 retains a copy of the data as it was received by the indexing system 620 such that the original data is always available for searching (e.g., no data is discarded, though, in some examples, the indexing system 620 can be configured to do so).

The search system 660 searches the data stored by the indexing system 620. As discussed in greater detail below, the search system 660 enables users associated with the computing environment 600 (and possibly also other users) to navigate the data, generate reports, and visualize search results in "dashboards" output using a graphical interface. Using the facilities of the search system 660, users can obtain insights about the data, such as retrieving events from an index, calculating metrics, searching for specific conditions within a rolling time window, identifying patterns in the data, and predicting future trends, among other examples. To achieve greater efficiency, the search system 660 can apply map-reduce methods to parallelize searching of large volumes of data. Additionally, because the original data is available, the search system 660 can apply a schema to the data at search time. This allows different structures to be applied to the same data, or for the structure to be modified if or when the content of the data changes. Application of a schema at search time may be referred to herein as a late-binding schema technique.

The user interface system 614 provides mechanisms through which users associated with the computing environment 600 (and possibly others) can interact with the data intake and query system 610. These interactions can include configuration, administration, and management of the indexing system 620, initiation and/or scheduling of queries that are to be processed by the search system 660, receipt or reporting of search results, and/or visualization of search results. The user interface system 614 can include, for example, facilities to provide a command line interface or a web-based interface.

Users can access the user interface system 614 using a computing device 604 that communicates with data intake and query system 610, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 600. For example, a person can log in as a particular user and, using the user's digital information, can access the data intake and query system 610. A user can be associated with one or more people, meaning that one or more people may be able to use the same user's digital information. For example, an administrative user account may be used by multiple people who have been given access to the administrative user account. Alternatively, or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 604 can provide a human-machine interface through which a person can have a digital presence in the computing environment 600 in the form of a user. The computing device 604 is an electronic device having one or more processors and a memory capable of storing instructions for execution by the one or more processors. The computing device 604 can further include input/output (I/O) hardware and a network interface. Applications executed by the computing device 604 can include a network access application 606, such as a web browser, which can use a network interface of the client computing device 604 to communicate, over a network, with the user interface system

614 of the data intake and query system 610. The user interface system 614 can use the network access application 606 to generate user interfaces that enable a user to interact with the data intake and query system 610. A web browser is one example of a network access application. A shell tool can also be used as a network access application. In some examples, the data intake and query system 610 is an application executing on the computing device 604. In such examples, the network access application 606 can access the user interface system 614 without going over a network.

The data intake and query system 610 can optionally include apps 612. An app of the data intake and query system 610 is a collection of configurations, knowledge objects (a user-defined entity that enriches the data in the data intake and query system 610), views, and dashboards that may provide additional functionality, different techniques for searching the data, and/or additional insights into the data. The data intake and query system 610 can execute multiple applications simultaneously. Example applications include an information technology service intelligence application, which can monitor and analyze the performance and behavior of the computing environment 600, and an enterprise security application, which can include content and searches to assist security analysts in diagnosing and acting on anomalous or malicious behavior in the computing environment 600.

Though FIG. 6 illustrates only one data source, in practical implementations, the computing environment 600 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 600, the data intake and query system 610 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 600 can include on-prem and cloud-based computing resources, or only cloud-based resources. For example, an entity may have on-prem computing devices and a private cloud. In this example, the entity operates the data intake and query system 610 and can choose to execute the data intake and query system 610 on an on-prem computing device or in the cloud. In another example, a provider entity operates the data intake and query system 610 in a public cloud and provides the functionality of the data intake and query system 610 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 610. In some implementations, the entity providing the data intake and query system 610 is itself subscribing to the cloud services of a cloud service provider. As an example, a first entity provides computing resources under a public cloud service model, a second entity subscribes to the cloud services of the first provider entity and uses the cloud computing resources to operate the data intake and query system 610, and a third entity can subscribe to the services of the second provider entity in order to use the functionality of the data intake and query system 610. In this example, the data sources are associated with the third entity, users accessing the data intake and query system 610 are associated with the third entity, and the analytics and insights provided by the data intake and query system 610 are for purposes of the third entity's operations.

FIG. 7 is a block diagram illustrating in greater detail an example of an indexing system 720 of a data intake and query system, such as the data intake and query system 610 of FIG. 6. The indexing system 720 of FIG. 7 uses various methods to obtain machine data from a data source 702 and stores the data in an index 738 of an indexer 732. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 720 enables the data intake and query system to obtain the machine data produced by the data source 702 and to store the data for searching and retrieval.

Users can administer the operations of the indexing system 720 using a computing device 704 that can access the indexing system 720 through a user interface system 714 of the data intake and query system. For example, the computing device 704 can be executing a network access application 706, such as a web browser or a terminal, through which a user can access a monitoring console 716 provided by the user interface system 714. The monitoring console 716 can enable operations such as: identifying the data source 702 for data ingestion; configuring the indexer 732 to index the data from the data source 702; configuring a data ingestion method; configuring, deploying, and managing clusters of indexers; and viewing the topology and performance of a deployment of the data intake and query system, among other operations. The operations performed by the indexing system 720 may be referred to as "index time" operations, which are distinct from "search time" operations that are discussed further below.

The indexer 732, which may be referred to herein as a data indexing component, coordinates and performs most of the index time operations. The indexer 732 can be implemented using program code that can be executed on a computing device. The program code for the indexer 732 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 732. In some implementations, the indexer 732 executes on the computing device 704 through which a user can access the indexing system 720. In some implementations, the indexer 732 executes on a different computing device than the illustrated computing device 704.

The indexer 732 may be executing on the computing device that also provides the data source 702 or may be executing on a different computing device. In implementations wherein the indexer 732 is on the same computing device as the data source 702, the data produced by the data source 702 may be referred to as "local data." In other implementations the data source 702 is a component of a first computing device and the indexer 732 executes on a second computing device that is different from the first computing device. In these implementations, the data produced by the data source 702 may be referred to as "remote data." In some implementations, the first computing device is "on-prem" and in some implementations the first computing device is "in the cloud." In some implementations, the indexer 732 executes on a computing device in the cloud and the operations of the indexer 732 are provided as a service to entities that subscribe to the services provided by the data intake and query system.

For a given data produced by the data source 702, the indexing system 720 can be configured to use one of several methods to ingest the data into the indexer 732. These methods include upload 722, monitor 724, using a forwarder 726, or using HyperText Transfer Protocol (HTTP 728) and an event collector 730. These and other methods for data ingestion may be referred to as "getting data in" (GDI) methods.

Using the upload 722 method, a user can specify a file for uploading into the indexer 732. For example, the monitoring console 716 can include commands or an interface through which the user can specify where the file is located (e.g., on which computing device and/or in which directory of a file system) and the name of the file. The file may be located at the data source 702 or maybe on the computing device where the indexer 732 is executing. Once uploading is initiated, the indexer 732 processes the file, as discussed further below. Uploading is a manual process and occurs when instigated by a user. For automated data ingestion, the other ingestion methods are used.

The monitor 724 method enables the indexing system 720 to monitor the data source 702 and continuously or periodically obtain data produced by the data source 702 for ingestion by the indexer 732. For example, using the monitoring console 716, a user can specify a file or directory for monitoring. In this example, the indexing system 720 can execute a monitoring process that detects whenever the file or directory is modified and causes the file or directory contents to be sent to the indexer 732. As another example, a user can specify a network port for monitoring. In this example, a monitoring process can capture data received at or transmitting from the network port and cause the data to be sent to the indexer 732. In various examples, monitoring can also be configured for data sources such as operating system event logs, performance data generated by an operating system, operating system registries, operating system directory services, and other data sources.

Monitoring is available when the data source 702 is local to the indexer 732 (e.g., the data source 702 is on the computing device where the indexer 732 is executing). Other data ingestion methods, including forwarding and the event collector 730, can be used for either local or remote data sources.

A forwarder 726, which may be referred to herein as a data forwarding component, is a software process that sends data from the data source 702 to the indexer 732. The forwarder 726 can be implemented using program code that can be executed on the computer device that provides the data source 702. A user launches the program code for the forwarder 726 on the computing device that provides the data source 702. The user can further configure the forwarder 726, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 726 can provide various capabilities. For example, the forwarder 726 can send the data unprocessed or can perform minimal processing on the data before sending the data to the indexer 732. Minimal processing can include, for example, adding metadata tags to the data to identify a source, source type, and/or host, among other information, dividing the data into blocks, and/or applying a timestamp to the data. In some implementations, the forwarder 726 can break the data into individual events (event generation is discussed further below) and send the events to a receiver. Other operations that the forwarder 726 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 730 provides an alternate method for obtaining data from the data source 702. The event collector 730 enables data and application events to be sent to the indexer 732 using HTTP 728. The event collector 730 can be implemented using program code that can be executing on a computing device. The program code may be a component of the data intake and query system or can be a standalone component that can be executed independently of the data intake and query system and operates in cooperation with the data intake and query system.

To use the event collector 730, a user can, for example using the monitoring console 716 or a similar interface provided by the user interface system 714, enable the event collector 730 and configure an authentication token. In this context, an authentication token is a piece of digital data generated by a computing device, such as a server, which contains information to identify a particular entity, such as a user or a computing device, to the server. The token will contain identification information for the entity (e.g., an alphanumeric string that is unique to each token) and a code that authenticates the entity with the server. The token can be used, for example, by the data source 702 as an alternative method to using a username and password for authentication.

To send data to the event collector 730, the data source 702 is supplied with a token and can then send HTTP 728 requests to the event collector 730. To send HTTP 728 requests, the data source 702 can be configured to use an HTTP client and/or to use logging libraries such as those supplied by Java, JavaScript, and .NET libraries. An HTTP client enables the data source 702 to send data to the event collector 730 by supplying the data, and a Uniform Resource Identifier (URI) for the event collector 730 to the HTTP client. The HTTP client then handles establishing a connection with the event collector 730, transmitting a request containing the data, closing the connection, and receiving an acknowledgment if the event collector 730 sends one. Logging libraries enable HTTP 728 requests to the event collector 730 to be generated directly by the data source. For example, an application can include or link a logging library, and through functionality provided by the logging library manage establishing a connection with the event collector 730, transmitting a request, and receiving an acknowledgement.

An HTTP 728 request to the event collector 730 can contain a token, a channel identifier, event metadata, and/or event data. The token authenticates the request with the event collector 730. The channel identifier, if available in the indexing system 720, enables the event collector 730 to segregate and keep separate data from different data sources. The event metadata can include one or more key-value pairs that describe the data source 702 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 730 extracts events from HTTP 728 requests and sends the events to the indexer 732. The event collector 730 can further be configured to send events to one or more indexers. Extracting the events can include associating any metadata in a request with the event or events included in the request. In these implementations, event generation by the indexer 732 (discussed further below) is bypassed, and the indexer 732 moves the events directly to indexing. In some implementations, the event collector 730 extracts event data from a request and outputs the event data to the indexer 732, and the indexer generates events from the event data. In some implementations, the event collector 730 sends an acknowledgement message to the data source 702 to indicate that the event collector 730 has received a particular request form the data source 702, and/or to indicate to the data source 702 that events in the request have been added to an index.

The indexer 732 ingests incoming data and transforms the data into searchable knowledge in the form of events. In the data intake and query system, an event is a single piece of data that represents activity of the component represented in FIG. 7 by the data source 702. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 732 can include a parsing module 734 and an indexing module 736 for generating and storing the events. The parsing module 734 and indexing module 736 can be modular and pipelined, such that one component can be operating on a first set of data while the second component is simultaneously operating on a second sent of data. Additionally, the indexer 732 may at any time have multiple instances of the parsing module 734 and indexing module 736, with each set of instances configured to simultaneously operate on data from the same data source or from different data sources. The parsing module 734 and indexing module 736 are illustrated in FIG. 7 to facilitate discussion, with the understanding that implementations with other components are possible to achieve the same functionality.

The parsing module 734 determines information about incoming event data, where the information can be used to identify events within the event data. For example, the parsing module 734 can associate a source type with the event data. A source type identifies the data source 702 and describes a possible data structure of event data produced by the data source 702. For example, the source type can indicate which fields to expect in events generated at the data source 702 and the keys for the values in the fields, and possibly other information such as sizes of fields, an order of the fields, a field separator, and so on. The source type of the data source 702 can be specified when the data source 702 is configured as a source of event data. Alternatively, the parsing module 734 can determine the source type from the event data, for example from an event field in the event data or using machine learning techniques applied to the event data.

Other information that the parsing module 734 can determine includes timestamps. In some cases, an event includes a timestamp as a field, and the timestamp indicates a point in time when the action represented by the event occurred or was recorded by the data source 702 as event data. In these cases, the parsing module 734 may be able to determine from the source type associated with the event data that the timestamps can be extracted from the events themselves. In some cases, an event does not include a timestamp and the parsing module 734 determines a timestamp for the event, for example from a name associated with the event data from the data source 702 (e.g., a file name when the event data is in the form of a file) or a time associated with the event data (e.g., a file modification time). As another example, when the parsing module 734 is not able to determine a timestamp from the event data, the parsing module 734 may use the time at which it is indexing the event data. As another example, the parsing module 734 can use a user-configured rule to determine the timestamps to associate with events.

The parsing module 734 can further determine event boundaries. In some cases, a single line (e.g., a sequence of characters ending with a line termination) in event data represents one event while in other cases, a single line represents multiple events. In yet other cases, one event may span multiple lines within the event data. The parsing module 734 may be able to determine event boundaries from the source type associated with the event data, for example from a data structure indicated by the source type. In some implementations, a user can configure rules the parsing module 734 can use to identify event boundaries.

The parsing module 734 can further extract data from events and possibly also perform transformations on the events. For example, the parsing module 734 can extract a set of fields (key-value pairs) for each event, such as a host or hostname, source or source name, and/or source type. The parsing module 734 may extract certain fields by default or based on a user configuration. Alternatively, or additionally, the parsing module 734 may add fields to events, such as a source type or a user-configured field. As another example of a transformation, the parsing module 734 can anonymize fields in events to mask sensitive information, such as social security numbers or account numbers. Anonymizing fields can include changing or replacing values of specific fields. The parsing module 734 can further perform user-configured transformations.

The parsing module 734 outputs the results of processing incoming event data to the indexing module 736, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 732 can be configured to identify searchable segments that are parts of fields, searchable segments that are entire fields, or both. The parsing module 734 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 746, to find event data that matches a search query. In some implementations, segmentation can alternatively be performed by the forwarder 726. Segmentation can also be disabled, in which case the indexer 732 will not build a lexicon for the event data. When segmentation is disabled, the search system searches the event data directly.

Building index data structures generates the index 738. The index 738 is a storage data structure on a storage device (e.g., a disk drive or other physical device for storing digital data). The storage device may be a component of the computing device on which the indexer 732 is operating (referred to herein as local storage) or may be a component of a different computing device (referred to herein as remote storage) that the indexer 738 has access to over a network. The indexer 732 can manage more than one index and can manage indexes of different types. For example, the indexer 732 can manage event indexes, which impose minimal structure on stored data and can accommodate any type of data. As another example, the indexer 732 can manage metrics indexes, which use a highly structured format to handle the higher volume and lower latency demands associated with metrics data.

The indexing module 736 organizes files in the index 738 in directories referred to as buckets. The files in a bucket 744 can include raw data files, index files, and possibly also other metadata files. As used herein, "raw data" means data as when the data was produced by the data source 702, without alteration to the format or content. As noted previously, the parsing module 734 may add fields to event data and/or perform transformations on fields in the event data. Event data that has been altered in this way is referred to herein as enriched data. A raw data file 748 can include enriched data, in addition to or instead of raw data. The raw data file 748 may be compressed to reduce disk usage. An index file 746, which may also be referred to herein as a "time-series index" or tsidx file, contains metadata that the indexer 732 can use to search a corresponding raw data file 748. As noted above, the metadata in the index file 746 includes a lexicon of the event data, which associates each unique keyword in the event data with a reference to the location of event data within the raw data file 748. The keyword data in the index file 746 may also be referred to as an inverted index. In various implementations, the data intake and query system can use index files for other purposes, such as to store data summarizations that can be used to accelerate searches.

A bucket 744 includes event data for a particular range of time. The indexing module 736 arranges buckets in the index 738 according to the age of the buckets, such that buckets for more recent ranges of time are stored in short-term storage 740 and buckets for less recent ranges of time are stored in long-term storage 742. Short-term storage 740 may be faster to access while long-term storage 742 may be slower to access. Buckets may be moves from short-term storage 740 to long-term storage 742 according to a configurable data retention policy, which can indicate at what point in time a bucket is old enough to be moved.

A bucket's location in short-term storage 740 or long-term storage 742 can also be indicated by the bucket's status. As an example, a bucket's status can be "hot," "warm," "cold," "frozen," or "thawed." In this example, hot bucket is one to which the indexer 732 is writing data and the bucket becomes a warm bucket when the index 732 stops writing data to it. In this example, both hot and warm buckets reside in short-term storage 740. Continuing this example, when a warm bucket is moved to long-term storage 742, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 720 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 720 through the monitoring console 716 provided by the user interface system 714. Using the monitoring console 716, the user can configure and monitor an index cluster, and see information such as disk usage by an index, volume usage by an indexer, index and volume size over time, data age, statistics for bucket types, and bucket settings, among other information.

Figure 8:
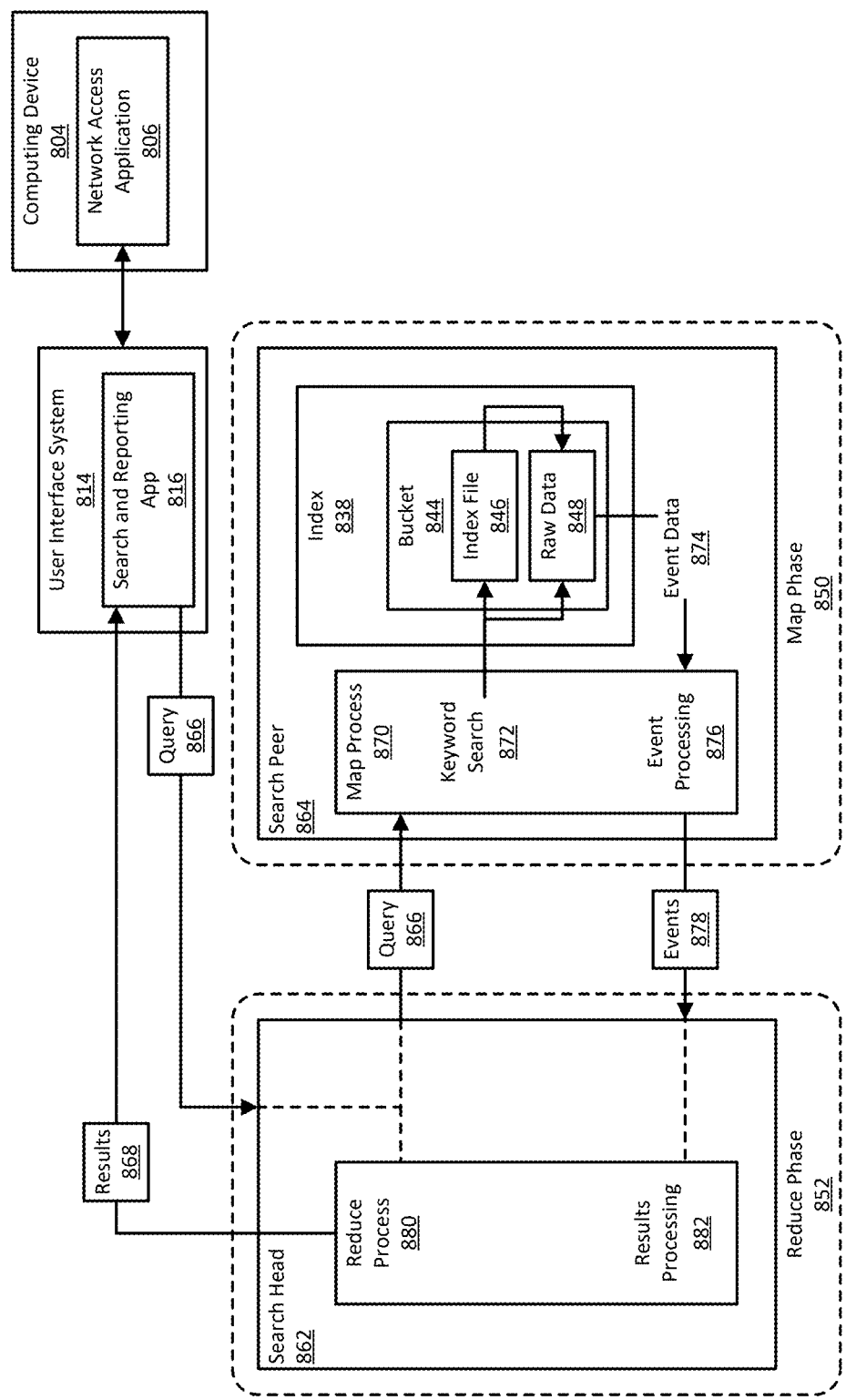
FIG. 8 is a block diagram illustrating in greater detail an example of the search system 860 of a data intake and query system.

FIG. 8 is a block diagram illustrating in greater detail an example of the search system 860 of a data intake and query system, such as the data intake and query system 610 of FIG. 6. The search system 860 of FIG. 8 issues a query 866 to a search head 862, which sends the query 866 to a search peer 864. Using a map process 870, the search peer 864 searches the appropriate index 838 for events identified by the query 866 and sends events 878 so identified back to the search head 862. Using a reduce process 882, the search head 862 processes the events 878 and produces results 868 to respond to the query 866. The results 868 can provide useful insights about the data stored in the index 838. These insights can aid in the administration of information technology systems, in security analysis of information technology systems, and/or in analysis of the development environment provided by information technology systems.

The query 866 that initiates a search is produced by a search and reporting app 816 that is available through the user interface system 814 of the data intake and query system. Using a network access application 806 executing on a computing device 804, a user can input the query 866 into a search field provided by the search and reporting app 816. Alternatively, or additionally, the search and reporting app 816 can include pre-configured queries or stored queries that can be activated by the user. In some cases, the search and reporting app 816 initiates the query 866 when the user enters the query 866. In these cases, the query 866 maybe referred to as an "ad-hoc" query. In some cases, the search and reporting app 816 initiates the query 866 based on a schedule. For example, the search and reporting app 816 can be configured to execute the query 866 once per hour, once per day, at a specific time, on a specific date, or at some other time that can be specified by a date, time, and/or frequency. These types of queries maybe referred to as scheduled queries.

The query 866 is specified using a search processing language. The search processing language includes commands or search terms that the search peer 864 will use to identify events to return in the search results 868. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 866 to include sequential commands, where a subsequent command may operate on the results of a prior command. As an example, sequential commands may be separated in the query 866 by a vertical line ("|" or "pipe") symbol.

In addition to one or more search commands, the query 866 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 866 occurs in two broad phases: a map phase 850 and a reduce phase 852. The map phase 850 takes place across one or more search peers. In the map phase 850, the search peers locate event data that matches the search terms in the search query 866 and sorts the event data into field-value pairs. When the map phase 850 is complete, the search peers send events that they have found to one or more search heads for the reduce phase 852. During the reduce phase 852, the search heads process the events through commands in the search query 866 and aggregate the events to produce the final search results 868.

A search head, such as the search head 862 illustrated in FIG. 8, is a component of the search system 860 that manages searches. The search head 862, which may also be referred to herein as a search management component, can be implemented using program code that can be executed on a computing device. The program code for the search head 862 can be stored on a non-transitory computer-readable medium and from this medium can be loaded or copied to the memory of a computing device. One or more hardware processors of the computing device can read the program code from the memory and execute the program code in order to implement the operations of the search head 862.

Upon receiving the search query 866, the search head 862 directs the query 866 to one or more search peers, such as the search peer 864 illustrated in FIG. 8. "Search peer" is an alternate name for "indexer" and a search peer may be largely similar to the indexer described previously. The search peer 864 may be referred to as a "peer node" when the search peer 864 is part of an indexer cluster. The search peer 864, which may also be referred to as a search execution component, can be implemented using program code that can be executed on a computing device. In some implementations, one set of program code implements both the search head 862 and the search peer 864 such that the search head 862 and the search peer 864 form one component. In some implementations, the search head 862 is an independent piece of code that performs searching and no indexing functionality. In these implementations, the search head 862 may be referred to as a dedicated search head.

The search head 862 may consider multiple criteria when determining whether to send the query 866 to the particular search peer 864. For example, the search system 860 may be configured to include multiple search peers that each have duplicative copies of at least some of the event data and are implanted using different hardware resources q. In this example, the sending the search query 866 to more than one search peer allows the search system 860 to distribute the search workload across different hardware resources. As another example, search system 860 may include different search peers for different purposes (e.g., one has an index storing a first type of data or from a first data source while a second has an index storing a second type of data or from a second data source). In this example, the search query 866 may specify which indexes to search, and the search head 862 will send the query 866 to the search peers that have those indexes.

To identify events 878 to send back to the search head 862, the search peer 864 performs a map process 870 to obtain event data 874 from the index 838 that is maintained by the search peer 864. During a first phase of the map process 870, the search peer 864 identifies buckets that have events that are described by the time indicator in the search query 866. As noted above, a bucket contains events whose timestamps fall within a particular range of time. For each bucket 844 whose events can be described by the time indicator, during a second phase of the map process 870, the search peer 864 performs a keyword search 872 using search terms specified in the search query 866. The search terms can be one or more of keywords, phrases, fields, Boolean expressions, and/or comparison expressions that in combination describe events being searched for. When segmentation is enabled at index time, the search peer 864 performs the keyword search 872 on the bucket's index file 846. As noted previously, the index file 846 includes a lexicon of the searchable terms in the events stored in the bucket's raw data 848 file. The keyword search 872 searches the lexicon for searchable terms that correspond to one or more of the search terms in the query 866. As also noted above, the lexicon incudes, for each searchable term, a reference to each location in the raw data 848 file where the searchable term can be found. Thus, when the keyword search identifies a searchable term in the index file 846 that matches a search term in the query 866, the search peer 864 can use the location references to extract from the raw data 848 file the event data 874 for each event that include the searchable term.

In cases where segmentation was disabled at index time, the search peer 864 performs the keyword search 872 directly on the raw data 848 file. To search the raw data 848, the search peer 864 may identify searchable segments in events in a similar manner as when the data was indexed. Thus, depending on how the search peer 864 is configured, the search peer 864 may look at event fields and/or parts of event fields to determine whether an event matches the query 866. Any matching events can be added to the event data 874 read from the raw data 848 file. The search peer 864 can further be configured to enable segmentation at search time, so that searching of the index 838 causes the search peer 864 to build a lexicon in the index file 846.

The event data 874 obtained from the raw data 848 file includes the full text of each event found by the keyword search 872. During a third phase of the map process 870, the search peer 864 performs event processing 876 on the event data 874, with the steps performed being determined by the configuration of the search peer 864 and/or commands in the search query 866. For example, the search peer 864 can be configured to perform field discovery and field extraction. Field discovery is a process by which the search peer 864 identifies and extracts key-value pairs from the events in the event data 874. The search peer 864 can, for example, be configured to automatically extract the first 100 fields (or another number of fields) in the event data 874 that can be identified as key-value pairs. As another example, the search peer 864 can extract any fields explicitly mentioned in the search query 866. The search peer 864 can, alternatively or additionally, be configured with particular field extractions to perform.

Other examples of steps that can be performed during event processing 876 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 864 sends processed events 878 to the search head 862, which performs a reduce process 880. The reduce process 880 potentially receives events from multiple search peers and performs various results processing 882 steps on the received events. The results processing 882 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 882 can further include applying commands from the search query 866 to the events. The query 866 can include, for example, commands for evaluating and/or manipulating fields (e.g., to generate new fields from existing fields or parse fields that have more than one value). As another example, the query 866 can include commands for calculating statistics over the events, such as counts of the occurrences of fields, or sums, averages, ranges, and so on, of field values. As another example, the query 866 can include commands for generating statistical values for purposes of generating charts of graphs of the events.

The reduce process 880 outputs the events found by the search query 866, as well as information about the events. The search head 862 transmits the events and the information about the events as search results 868, which are received by the search and reporting app 816. The search and reporting app 816 can generate visual interfaces for viewing the search results 868. The search and reporting app 816 can, for example, output visual interfaces for the network access application 806 running on a computing device 804 to generate.

The visual interfaces can include various visualizations of the search results 868, such as tables, line or area charts, Chloropleth maps, or single values. The search and reporting app 816 can organize the visualizations into a dashboard, where the dashboard includes a panel for each visualization. A dashboard can thus include, for example, a panel listing the raw event data for the events in the search results 868, a panel listing fields extracted at index time and/or found through field discovery along with statistics for those fields, and/or a timeline chart indicating how many events occurred at specific points in time (as indicated by the timestamps associated with each event). In various implementations, the search and reporting app 816 can provide one or more default dashboards. Alternatively, or additionally, the search and reporting app 816 can include functionality that enables a user to configure custom dashboards.

The search and reporting app 816 can also enable further investigation into the events in the search results 868. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 866. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 9:
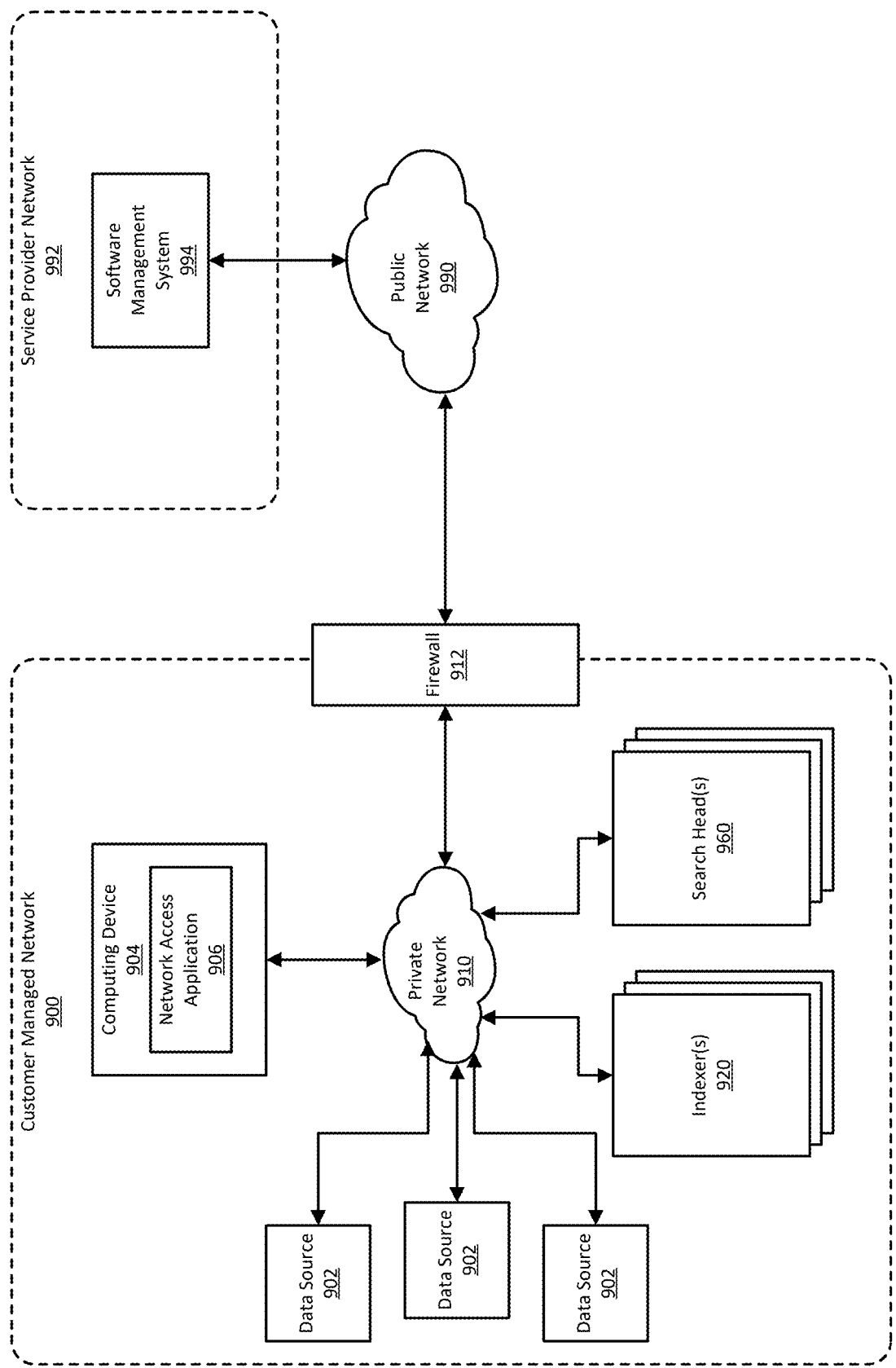
FIG. 9 illustrates an example of a customer-managed network 900 that includes a data intake and query system.

FIG. 9 illustrates an example of a self-managed network 900 that includes a data intake and query system. "Self-managed" in this instance means that the entity that is operating the self-managed network 900 configures, administers, maintains, and/or operates the data intake and query system using its own compute resources and people. Further, the self-managed network 900 of this example is part of the entity's on-premise network and comprises a set of compute, memory, and networking resources that are located, for example, within the confines of an entity's data center. These resources can include software and hardware resources. The entity can, for example, be a company or enterprise, a school, government entity, or other entity. Since the self-managed network 900 is located within the customer's on-prem environment, such as in the entity's data center, the operation and management of the self-managed network 900, including of the resources in the self-managed network 900, is under the control of the entity. For example, administrative personnel of the entity have complete access to and control over the configuration, management, and security of the self-managed network 900 and its resources.

The self-managed network 900 can execute one or more instances of the data intake and query system. An instance of the data intake and query system may be executed by one or more computing devices that are part of the self-managed network 900. A data intake and query system instance can comprise an indexing system and a search system, where the indexing system includes one or more indexers 920 and the search system includes one or more search heads 960.

As depicted in FIG. 9, the self-managed network 900 can include one or more data sources 902. Data received from these data sources may be processed by an instance of the data intake and query system within self-managed network 900. The data sources 902 and the data intake and query system instance can be communicatively coupled to each other via a private network 910.

Users associated with the entity can interact with and avail themselves of the functions performed by a data intake and query system instance using computing devices. As depicted in FIG. 9, a computing device 904 can execute a network access application 906 (e.g., a web browser), that can communicate with the data intake and query system instance and with data sources 902 via the private network 910. Using the computing device 904, a user can perform various operations with respect to the data intake and query system, such as management and administration of the data intake and query system, generation of knowledge objects, and other functions. Results generated from processing performed by the data intake and query system instance may be communicated to the computing device 904 and output to the user via an output system (e.g., a screen) of the computing device 904.

The self-managed network 900 can also be connected to other networks that are outside the entity's on-premise environment/network, such as networks outside the entity's data center. Connectivity to these other external networks is controlled and regulated through one or more layers of security provided by the self-managed network 900. One or more of these security layers can be implemented using firewalls 912. The firewalls 912 form a layer of security around the self-managed network 900 and regulate the transmission of traffic from the self-managed network 900 to the other networks and from these other networks to the self-managed network 900.

Networks external to the self-managed network can include various types of networks including public networks 990, other private networks, and/or cloud networks provided by one or more cloud service providers. An example of a public network 990 is the Internet. In the example depicted in FIG. 9, the self-managed network 900 is connected to a service provider network 992 provided by a cloud service provider via the public network 990.

In some implementations, resources provided by a cloud service provider may be used to facilitate the configuration and management of resources within the self-managed network 900. For example, configuration and management of a data intake and query system instance in the self-managed network 900 may be facilitated by a software management system 994 operating in the service provider network 992. There are various ways in which the software management system 994 can facilitate the configuration and management of a data intake and query system instance within the self-managed network 900. As one example, the software management system 994 may facilitate the download of software including software updates for the data intake and query system. In this example, the software management system 994 may store information indicative of the versions of the various data intake and query system instances present in the self-managed network 900. When a software patch or upgrade is available for an instance, the software management system 994 may inform the self-managed network 900 of the patch or upgrade. This can be done via messages communicated from the software management system 994 to the self-managed network 900.

The software management system 994 may also provide simplified ways for the patches and/or upgrades to be downloaded and applied to the self-managed network 900. For example, a message communicated from the software management system 994 to the self-managed network 900 regarding a software upgrade may include a Uniform Resource Identifier (URI) that can be used by a system administrator of the self-managed network 900 to download the upgrade to the self-managed network 900. In this manner, management resources provided by a cloud service provider using the service provider network 992 and which are located outside the self-managed network 900 can be used to facilitate the configuration and management of one or more resources within the entity's on-prem environment. In some implementations, the download of the upgrades and patches may be automated, whereby the software management system 994 is authorized to, upon determining that a patch is applicable to a data intake and query system instance inside the self-managed network 900, automatically communicate the upgrade or patch to self-managed network 900 and cause it to be installed within self-managed network 900.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
    detecting an auto collection operator in a first set of query instructions, the first set of query instructions comprising a multimode field operator that executes on a first plurality of elements in a single field of a single event based on a collection type of the single field; and
    processing a first event of a first plurality of events according to the first set of query instructions by:
        executing, by auto collection instructions identified by the auto collection operator, a first collection type field check on a first field in the first event to determine whether the collection type of the first field is a first collection type,
        executing, responsive at least in part to determining that the collection type of the first field is not the first collection type, a second collection type field check on the first field to determine whether the collection type of the first field is a second collection type,
        processing, by second data mode instructions identified by the multimode field operator and based on the collection type being the second collection type, a first plurality of values to generate a first query result, and
    outputting the first query result responsive to the first set of query instructions.

2. The computer-implemented method of claim 1, wherein the first collection type is an unstructured data format, and the second collection type is a structured data format.

3. The computer-implemented method of claim 1, wherein the second collection type is a structured data format, and the second collection type field check is executing a structured data format parser.

4. The computer-implemented method of claim 1, wherein the second data mode instructions iterate through each value of the first plurality of values to individually process each value.

5. The computer-implemented method of claim 1, wherein the second data mode instructions iterate through each value of the first plurality of values when triggering an element function instruction individually on each value.

6. The computer-implemented method of claim 1, wherein the processing by the second data mode instructions comprise triggering an element function instruction identified by an element function operator on the first plurality of values.

7. The computer-implemented method of claim 1, further comprising:
    detecting the auto collection operator in a second set of query instructions; and
    processing a second event of a second plurality of events according to the second set of query instructions by:
        executing, by the auto collection instructions identified by the auto collection operator, the first collection type field check on a second field in the second event to determine whether the collection type of the second field is the first collection type,
        processing, by first data mode instructions identified by the multimode field operator and based on the collection type being the first collection type, a second plurality of values to generate a second query result, and outputting the second query result responsive to the second set of query instructions.

8. The computer-implemented method of claim 1, further comprising:

executing, by the auto collection instructions identified by the auto collection operator, the first collection type field check on a second field in a second event to determine whether the collection type of the second field is the first collection type, processing, by first multiple value mode instructions identified by the multimode field operator and based on the collection type being the first collection type, a second plurality of values in the second field to generate a second query result, and wherein the first multiple value mode instructions iterate through each value of the first plurality of values to individually process each value.

9. The computer-implemented method of claim 1, further comprising:

initiating compiling a source query;

adding, based on source functions identified in the source query, the multimode field operator and an element function operator to a compiled query;

detecting that the first field identified by the multimode field operator has an unknown collection type; and adding the auto collection operator to the compiled query based on the first field having the unknown collection type, wherein the compiled query comprises the first set of query instructions.

10. The computer-implemented method of claim 1, blocking execution of an element function instruction based on determining that the first field has an unknown collection type.

11. A computing device, comprising:

a processor; and a non-transitory computer-readable medium having stored thereon instructions that, when executed by the processor, cause the processor to perform operations including:

detecting an auto collection operator in a first set of query instructions, the first set of query instructions comprising a multimode field operator that executes on a first plurality of elements in a single field of a single event based on a collection type of the single field; and processing a first event of a first plurality of events according to the first set of query instructions by:

executing, by auto collection instructions identified by the auto collection operator, a first collection type field check on a first field in the first event to determine whether the collection type of the first field is a first collection type, executing, responsive at least in part to determining that the collection type of the first field is not the first collection type, a second collection type field check on the first field to determine whether the collection type of the first field is a second collection type, processing, by second data mode instructions identified by the multimode field operator and based on the collection type being the second collection type, a first plurality of values to generate a first query result, and outputting the first query result responsive to the first set of query instructions.

12. The computing device of claim 11, wherein the first collection type is an unstructured data format, and the second collection type is a structured data format.

13. The computing device of claim 11, wherein the second collection type is a structured data format, and the second collection type field check is executing a structured data format parser.

14. The computing device of claim 11, wherein the second data mode instructions iterate through each value of the first plurality of values to individually process each value.

15. The computing device of claim 11, wherein the second data mode instructions iterate through each value of the first plurality of values when triggering an element function instruction individually on each value.

16. The computing device of claim 11, wherein the processing by the second data mode instructions comprise triggering an element function instruction identified by an element function operator on the first plurality of values.

17. The computing device of claim 11, further comprising:

detecting the auto collection operator in a second set of query instructions; and processing a second event of a second plurality of events according to the second set of query instructions by:

executing, by the auto collection instructions identified by the auto collection operator, the first collection type field check on a second field in the second event to determine whether the collection type of the second field is the first collection type, processing, by first data mode instructions identified by the multimode field operator and based on the collection type being the first collection type, a second plurality of values to generate a second query result, and outputting the second query result responsive to the second set of query instructions.

18. The computing device of claim 11, further comprising:

executing, by the auto collection instructions identified by the auto collection operator, the first collection type field check on a second field in a second event to determine whether the collection type of the second field is the first collection type, processing, by first multiple value mode instructions identified by the multimode field operator and based on the collection type being the first collection type, a second plurality of values in the second field to generate a second query result, and wherein the first multiple value mode instructions iterate through each value of the first plurality of values to individually process each value.

19. A non-transitory computer-readable medium having stored thereon instructions that, when executed by one or more processors, cause the one or more processors to perform operations including:

detecting an auto collection operator in a first set of query instructions, the first set of query instructions comprising a multimode field operator that executes on a first plurality of elements in a single field of a single event based on a collection type of the single field; and processing a first event of a first plurality of events according to the first set of query instructions by:

executing, by auto collection instructions identified by the auto collection operator, a first collection type field check on a first field in the first event to determine whether the collection type of the first field is a first collection type, executing, responsive at least in part to determining that the collection type of the first field is not the first collection type, a second collection type field check on the first field to determine whether the collection type of the first field is a second collection type, processing, by second data mode instructions identified by the multimode field operator and based on the collection type being the second collection type, a first plurality of values to generate a first query result, and outputting the first query result responsive to the first set of query instructions.

20. The non-transitory computer-readable medium of claim 19, wherein the first collection type is an unstructured data format, and the second collection type is a structured data format.

\* \* \* \* \*